Figure 1:
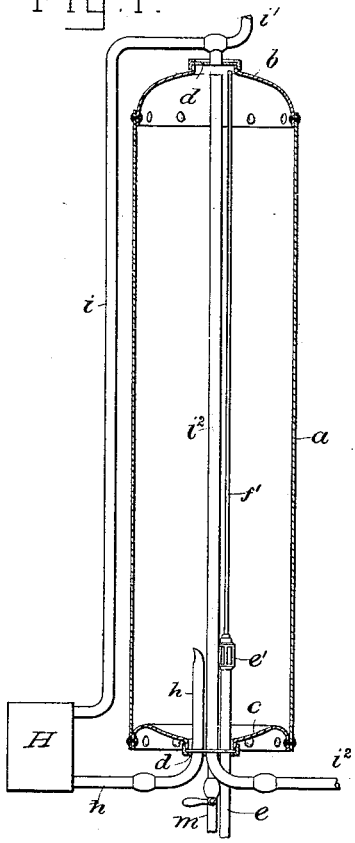

(No Model.)

A. P. CREQUE.
APPARATUS FOR HEATING WATER.

No. 377,096. Patented Jan. 31, 1888.

Witnesses.
John F. Nelson
John F. C. Prinkert

Inventor.
Allen P. Creque
by Crosby & Gregory
Attys.

UNITED STATES PATENT OFFICE.

ALLEN P. CREQUE, OF NEW YORK, N. Y.

APPARATUS FOR HEATING WATER.

SPECIFICATION forming part of Letters Patent No. 377,096, dated January 31, 1888.

Application filed January 2, 1885. Serial No. 151,763. (No model.)

*To all whom it may concern:*

Be it known that I, ALLEN P. CREQUE, of New York city, county, and State, have invented an Improvement in Apparatus for Heating Water, of which the following description, in connection with the accompanying drawings, is a specification, like letters on the drawings representing like parts.

My invention is embodied in an apparatus such as is employed for heating and circulating water for domestic purposes, the apparatus comprising a reservoir or range-boiler to contain the heated water and means to maintain a circulation of the water from the said reservoir through a heating device acted on by the fire in a range, stove, or furnace. The reservoir is supplied with cold water from a pipe discharging into the reservoir near its lower end with sufficient pressure to force the heated water out from the said reservoir when a faucet is opened in the heated-water discharge-pipe, or a passage is otherwise provided for the same.

In apparatus of this kind as usually constructed when the pressure is reduced in the cold-water inlet-pipe by cutting off the supply of water, or by breakage in the said pipe, or otherwise, the water is likely to be withdrawn from the reservoir through the said inlet-pipe, which is objectionable for various reasons.

The main object of this invention is to decrease the liability of explosion and collapsion of boilers, and to maintain a uniform pressure and the circulation of water in only the proper direction; and this invention consists, essentially, in the combination of the cold-water inlet-pipe with a main or check valve, which, when opened, permits the water to discharge laterally into the lower portion of the reservoir, and when closed prevents the escape of water from the lower portion of the reservoir, and a secondary or relief valve, which will be open when the main or check valve is closed, and will then provide an outlet or relief passage leading from the upper end of the reservoir for the escape of water or steam, thus relieving the reservoir from undue strain without permitting the reservoir to be emptied. When the pressure increases in the inlet-pipe so that water is again permitted to enter the reservoir therefrom, the secondary or relief valve closes, thus preventing the admission of water to the upper part of the reservoir, where cold water, if admitted, might encounter steam and condense the same so as to cause the reservoir to collapse.

In my improved apparatus the cold water cannot be delivered by the cold-water inlet-pipe directly into steam or hot water at the top of the reservoir, but must rise from the lower portion of the said reservoir.

Figure 2:
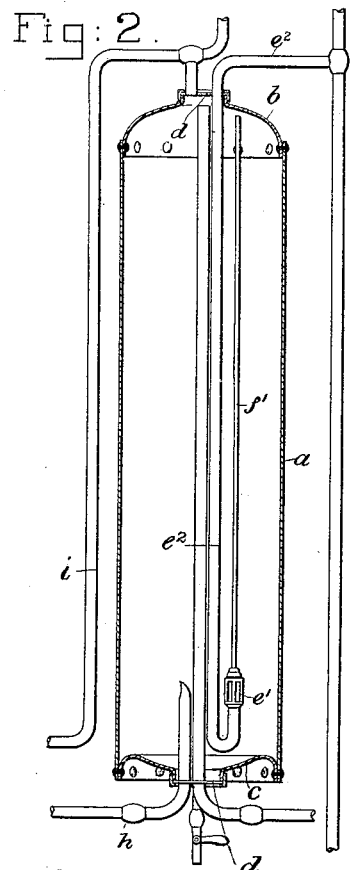
Figure 3:
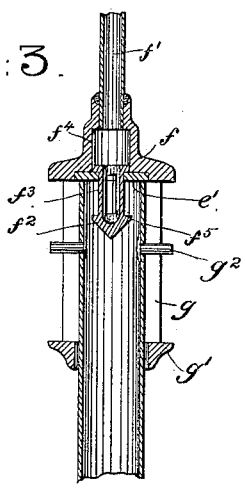

Figure 1 is a longitudinal section of the reservoir and connected pipes; Fig. 2, a similar view of a modified arrangement in which the cold-water inlet-pipe passes in at the top of the reservoir, and then down through the water in the reservoirs to near the bottom thereof; Fig. 3, a longitudinal section of the main or check and the secondary or relief valves enlarged, the main or check valve being closed and the secondary or relief valve open.

The reservoir $a$, of any suitable or usual size, shape, and material, has its upper and lower ends, $b$ $c$, provided with multi-passage covers $d$, such as described in another application filed by me, Serial No. 181,762, and therefore not herein claimed. As shown in Fig. 1, cold water is supplied to the reservoir through an inlet-pipe, $e$, passing through the said cover $d$ at the lower end of the reservoir, the discharge-orifice $e'$ of the said pipe being at some distance above the bottom of the reservoir. As shown in Fig. 2, the inlet-pipe $e^2$ enters through the cover $d$ at the top of the reservoir, from which it extends down through the interior of the reservoir nearly to its lower end, and is then curved upward, as shown, so that the discharge-orifice $e'$ is in substantially the same position relative to the reservoir as in the arrangement shown in Fig. 1. Whenever an outlet is provided from the reservoir, the pressure of the water in the cold-water inlet-pipe will raise the main or check valve $f$, and the water will enter the reservoir through the orifice of the said pipe, upon which orifice the said main valve is normally seated by the action of gravity when no water is entering the reservoir therefrom, and in this position it also prevents the escape of the water from the lower part of the reservoir. It is necessary to provide a vent for the reservoir to accommodate the expansion of the water in heating or to permit the escape of steam which may generate, and for this purpose the main or check valve is provided with a relief-tube, $f'$, extending nearly to the upper end of the reservoir. The said relief-tube is provided with a secondary or relief valve, $f^2$, shown in the present instance as consisting of a short tube communicating with the relief-tube $f'$ and having lateral passages $f^3$, which, when the said valve $f^2$ is in its lowest position, communicate with the inlet-pipe, thus connecting the latter with the relief-tube and affording a vent for the passage of water or steam from the upper portion of the reservoir. The secondary or relief valve $f'$ is longitudinally movable in a valve-chamber, $f^4$, in the main or check valve $f$. The main or check valve $f$, when closed, cuts off direct communication with the cold-water inlet-pipe from the lower part of the reservoir, so that the said reservoir cannot be emptied through the said inlet-pipe below the upper end of the relief-pipe $f'$. When the water enters the reservoir from the inlet-pipe, it first raises the secondary or relief valve $f^2$ until the shoulder $f^5$ at the lower end thereof seats on the main or check valve and prevents the incoming water from entering the relief-pipe $f'$ and being discharged into the upper end of the reservoir.

The lower end of the secondary or relief valve is inclined, as shown, thus causing the water issuing from the inlet-pipe to be delivered laterally into the reservoir toward all sides. The main or check valve $f$ is provided with guide-arms $g$, extending along the end of the inlet-pipe, and has connected with it a ring, $g'$, surrounding the said pipe, which latter is provided with stop projections $g^2$, to engage the said ring and arrest the upward movement of the said valve.

The circulation of the water through the heater (indicated at H, Fig. 1) is effected by the circulating-pipe $h$, which takes the cooler water from the lower end of the reservoir to the lower portion of the heater, in which it expands as it becomes heated, and returns to the reservoir through the pipe $i$, leading from the upper portion of the heater to the top of the reservoir, which latter it enters through the cover $d$, delivering the hot water directly into the upper end of the reservoir. The pipe $i$ is continued, as shown at $i'$, to the various points above the reservoir where the hot water is to be used, and when a faucet is opened in the said pipe $i'$ the hot water escapes from it, being forced out from the reservoir and replaced by cold water entering through the inlet-pipe $e$ or $e^2$ and orifice $e'$.

Heated water may also be withdrawn from the reservoir through the pipe $i^2$, extending from the upper end of the reservoir down through the same, and passing out through the cover $d$ at the lower end thereof. The mouth of the pipe $h$ is made at one side of the said pipe, as shown, and is preferably turned away from the orifice of the inlet-pipe, so that the incoming water will not flow directly toward the mouth of the said pipe $h$, which is also placed a short distance above the bottom plate of the reservoir, so that the sediment contained on the said bottom plate will not enter the pipe $h$, and will not be disturbed by the circulation of the water through the said pipe, nor by its inflow from the inlet-pipe.

The cover $d$ at the lower end of the reservoir is provided with a sediment-pipe, $m$, through which the water may be drawn from the reservoir for the purpose of removing the sediment from the bottom thereof.

I have herein shown a main or check valve which I prefer to employ; but I desire it to be understood that I may employ, instead of the particular main or check valve shown, any other well-known main or check valve which, in connection with the cold-water inlet-pipe and the boiler, will operate as and for the purposes herein described.

I claim—

1. The water-reservoir and cold-water inlet-pipe having its eduction-orifice near the lower portion of the reservoir, and a check-valve to prevent the water in the reservoir from flowing from the lower portion of the reservoir back into the inlet-pipe, combined with a relief-valve and a relief-pipe co-operating with the said valve, the said relief-pipe being extended into the upper portion of the reservoir and serving to conduct water or steam from the upper portion of the said reservoir into the said inlet-pipe whenever the said relief-valve is permitted to fall by the absence of pressure in the said inlet pipe, substantially as described.

2. The inlet-pipe having a main or check valve, combined with a relief-pipe and a relief-valve controlling the relief-pipe, the said relief-valve being governed in its action by the said main or check valve, substantially as described.

In testimony whereof I have signed my name to this specification in the presence of two subscribing witnesses.

ALLEN P. CREQUE.

Witnesses:
G. W. GREGORY,
JOS. P. LIVERMORE.